United States Patent
Dalsgaard et al.

(10) Patent No.: US 9,838,921 B2
(45) Date of Patent: Dec. 5, 2017

(54) CALL RE-ESTABLISHMENT IN A MULTI-LAYER HETEROGENEOUS NETWORK

(71) Applicant: Nokia Technologies Oy, Espoo (FI)

(72) Inventors: Lars Dalsgaard, Espoo (FI); Jussi-Pekka Koskinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/891,773

(22) PCT Filed: May 21, 2014

(86) PCT No.: PCT/US2014/038923
§ 371 (c)(1),
(2) Date: Nov. 17, 2015

(87) PCT Pub. No.: WO2014/190021
PCT Pub. Date: Nov. 27, 2014

(65) Prior Publication Data
US 2016/0119828 A1    Apr. 28, 2016

Related U.S. Application Data

(60) Provisional application No. 61/825,828, filed on May 21, 2013.

(51) Int. Cl.
*H04W 36/04* (2009.01)
*H04W 36/00* (2009.01)
*H04W 76/02* (2009.01)

(52) U.S. Cl.
CPC ....... *H04W 36/0055* (2013.01); *H04W 36/04* (2013.01); *H04W 76/027* (2013.01); *H04W 76/028* (2013.01)

(58) Field of Classification Search
CPC .................................................. H04W 36/04
See application file for complete search history.

(56) References Cited

U.S. PATENT DOCUMENTS 9,204,316 B2 * 12/2015 Suzuki ................. H04W 24/02
9,204,373 B2 * 12/2015 Arora ................... H04W 48/14
2014/0204733 A1   7/2014 Takahashi et al.

FOREIGN PATENT DOCUMENTS

| EP | 2398280 A1 | 12/2011 |
| WO | WO-2012/019363 A1 | 2/2012 |
| WO | WO-2013/002166 A1 | 1/2013 |

OTHER PUBLICATIONS

3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012.

(Continued)

*Primary Examiner* — Michael T Vu
(74) *Attorney, Agent, or Firm* — Mintz Levin Cohn Ferris Glovsky and Popeo, P.C.

(57) ABSTRACT

Methods and apparatus, including computer program products, are provided for call re-establishment. In one aspect there is provided a method. The method may include determining a radio link failure between a user equipment and a base station; and sending, by the user equipment after the determined radio link failure, a request to re-establish a connection, wherein the request includes layer information identifying the base station in a network. Related apparatus, systems, methods, and articles are also described.

10 Claims, 4 Drawing Sheets

(56) References Cited

OTHER PUBLICATIONS

3GPP, "Technical Specification Group Radio Access Network; Evolved Universal Terrestrial Radio Access (E-UTRA); Mobility enhancements in heterogeneous networks (Release 11)," 3rd Generation Partnership Project, 3GPP TR 36.839 V11.1.0, Dec. 2012.

3GPP, "Technical Specification Group Radio Access Network; Evolved Universal Terrestrial Radio Access (E-UTRA); Multiplexing and channel coding (Release 11)," 3rd Generation Partnership Project, 3GPP TS 36.212 V11.2.0, Feb. 2013.

3GPP, "Technical Specification Group Radio Access Network; Evolved Universal Terrestrial Radio Access (E-UTRA); Physical Channels and Modulation (Release 11)," 3rd Generation Partnership Project, 3GPP TS 36.211 V11.2.0, Feb. 2013.

3GPP, "Technical Specification Group Radio Access Network; Evolved Universal Terrestrial Radio Access (E-UTRA); Physical layer procedures (Release 11)," 3rd Generation Partnership Project, 3GPP TS 36.213 V11.2.0, Feb. 2013.

3GPP, "Technical Specification Group Radio Access Network; Evolved Universal Terrestrial Radio Access (E-UTRA); Physical Layer; Measurements (Release 11)," 3rd Generation Partnership Project, 3GPP TS 36.214 V11.1.0, Feb. 2012.

3GPP, "Technical Specification Group Radio Access Network; Evolved Universal Terrestrial Radio Access (E-UTRA); Radio Resource Control (RRC); Protocol specification (Release 11)," 3rd Generation Partnership Project, 3GPP TS 36.331 V11.3.0, Mar. 2013.

3GPP, "Technical Specification Group Radio Access Network; Evolved Universal Terrestrial Radio Access (E-UTRA); User Equipment (UE) radio transmission and reception (Release 11)," 3rd Generation Partnership Project, 3GPP TS 36.101 V11.4.0, Mar. 2013.

* cited by examiner

CALL RE-ESTABLISHMENT IN A MULTI-LAYER HETEROGENEOUS NETWORK

CROSS REFERENCE TO RELATED APPLICATION

This application is a national stage application, filed under 35 U.S.C. §371, of PCT Application No. PCT/US2014/038923, filed on May 21, 2014 entitled, "Call Re-Establishment in a Multi-layer Heterogeneous Network," and claims priority to U.S. Provisional Patent Application Ser. No. 61/825,828 filed on May 21, 2013 entitled, "Call Re-Establishment in a Multi-layer Heterogeneous Network," the contents which are hereby incorporated by reference in their entirety

FIELD

The subject matter described herein relates to wireless communications.

BACKGROUND

The use of heterogeneous networks (HetNets) may provide opportunities for offloading traffic from macrocells to a typically higher capacity small cell. The heterogeneous network may include one or more wireless access points, or base stations, such as for example an E-UTRAN (evolved Universal Mobile Telecommunications System Terrestrial Radio Access Network) NodeB base station serving macrocells and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have functionality similar to a typical base station, such as for example an E-UTRAN NodeB (eNB) base station, but the small cell base station may have less range and output power given its limited coverage area. For example, the small cell base station may be implemented as a wireless access point/femtocell base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

Methods and apparatus, including computer program products, are provided for call re-establishment.

In some example embodiments, there is provided a method. The method may include determining a radio link failure between a user equipment and a base station; and sending, by the user equipment after the determined radio link failure, a request to re-establish a connection, wherein the request includes layer information identifying the base station in a network.

In some example embodiments, there is provided a method. The method may include receiving, at a base station, a request to re-establish a connection after a radio link failure at a user equipment, wherein the request includes layer information identifying the base station in a network; and re-establishing the connection to the base station based on at least the layer information.

In some variations of the above, one or more of the following features as well as additional features disclosed in the detailed description can optionally be included in any feasible combination. The request may include a radio resource connection re-establishment request message including a physical cell identity of the cell. The layer information may include at least one of a carrier frequency of the base station, a global cell identifier identifying the base station, an absolute radio frequency channel number identifying a carrier frequency of the base station, and an indication of whether the carrier frequency of the base station is the same as a current base station serving the user equipment. The network may include a heterogeneous network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
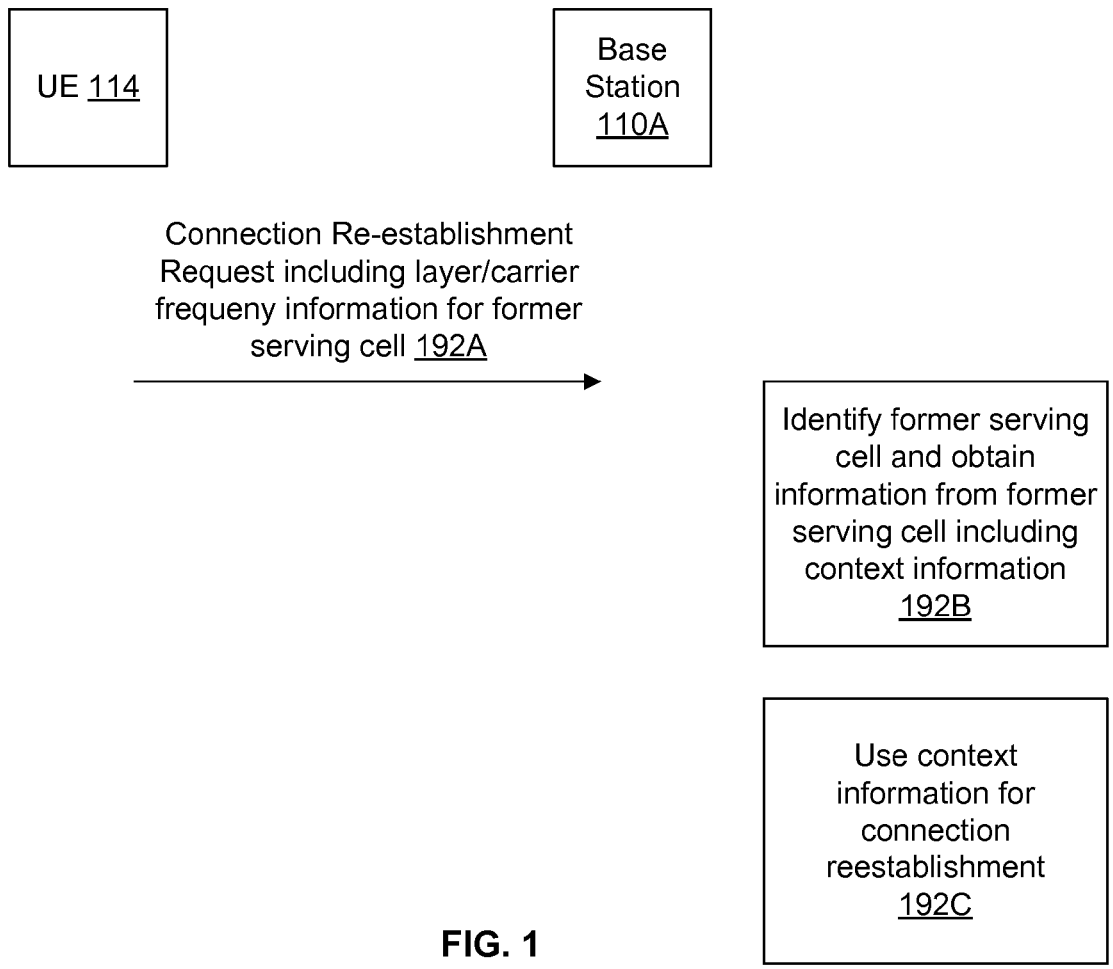
FIG. 1 depicts an example a process for call re-establishment, in accordance with some exemplary embodiments.

Like labels are used to refer to same or similar items in the drawings.

DETAILED DESCRIPTION

Heterogeneous network may include macrocells and small cells at a plurality of carrier frequencies and multi-layers. These layers may correspond to a first layer associated with a macro base station serving a macrocell at a first carrier frequency and one or more other layers associated with small cell base stations serving small cells at other carrier frequencies. When this is the case, a user equipment trying to initiate a call re-establishment procedure due to for example a radio link failure (RLF) may need to select a cell for attempting the call re-establishment. To that end, the former serving cell (i.e., before the RLF or call re-establishment procedure) may be able to provide information, such as the user equipment context which may be used to prepare a subsequent cell for a handover. Moreover, this user equipment context may be obtained from the former cell via a context fetch procedure using the former serving cell's Physical Cell Identity (PCID). However, the former serving cell may be from a layer (for example, carrier frequency) other than the layer (for example, carrier frequency) of a current cell, such as a cell being selected for call re-establishment. In HetNets having a plurality of layers (which represents cells at different carrier frequencies), the PCID identifying the former serving cell may not be unique because the same PCID may be in use for different cells on different layers/carrier frequencies.

In some example embodiments, the subject matter disclosed herein may relate to identifying a former cell in a network, such as a HetNet including for example multi-layers corresponding to multiple carrier frequencies.

FIG. 1 depicts an example process 100 including a user equipment 114 and a network including at least a base station 110A, in accordance with some example embodiments. FIG. 1 also depicts a path 167 along which user equipment 114 travels.

At 192A, a message may be sent by the user equipment 114A to the base station 110A, although this message may be sent to other base stations serving user equipment 114 as well. This message may be sent after a radio link failure (RLF) and include a radio resource control (RRC) connection re-establishment request message (RRCConnection-ReestablishmentRequest) including a PCID identifying a former serving cell and layer information for the former serving cell. The layer information may include a carrier frequency of the former serving cell to allow identification of the former serving cell in a multi-layer network. For example, the former serving cell's PCID and the layer information, such as the carrier frequency, may enable the network including base station 110A to identify the former serving cell in a multilayer network and obtain information from the former serving cell (for example, obtain user equipment context information, such as establishment of the necessary overall initial UE context including radio access bearer context, security context, roaming restriction, signaling connection identifier(s) and the like).

As noted, the use of the layer information may provide additional information to allow identifying the former serving cell in multi-layer networks, such as HetNets, in which the PCID may not uniquely identify a cell, such as a former serving cell.

In some example embodiments, the layer information included in message 192A may include an indication of whether the user equipment is coming from a prior cell/carrier frequency other than the carrier frequency of a current cell. For example, the indication may be implemented as a binary value to represent whether or not the user equipment came from a carrier frequency other than the carrier frequency of a current cell, although some other type of indication may be used. In this example, if the indication represents a yes (for example, the former cell has a different carrier frequency than the current cell), then the PCID may not be unique, requiring thus layer information, such as the carrier frequency of former cell, to enable identification of the former cell. However, if the indication represents a no (for example, the former cell has the same carrier frequency as the current cell), then the PCID is unique and does not require layer information.

In some example embodiments, the layer information included in message 192A may include a global cell identifier (for example, CellGlobalIdEUTRA). The global cell identifier may be included in addition to, or instead of, the PCID in message 192A. The global cell identifier may allow the network to identify the former cell from which the user equipment came.

In some example embodiments, the layer information included in message 192A may include a channel number representative of the carrier frequency of the cell of interest, such as the former cell. For example, an Absolute Radio Frequency Channel Number (ARFCN-ValueEUTRA), as described in 3GPP, TS 36.101, Evolved Universal Terrestrial Radio Access (E-UTRA); User Equipment (user equipment) radio transmission and reception, Mar. 22, 2013, may be used in the request 192A to uniquely identify the carrier frequency of the cell of interest in a multi-layer HetNet system. Table 1 below depicts an example implementation of an information element for an Absolute Radio Frequency Channel Number.

TABLE 1

| ARFCN-ValueEUTRA information element |
| --- |
| -- ASN1START<br>ARFCN-ValueEUTRA ::=    INTEGER (0..maxEARFCN)<br>-- ASN1STOP |

Although the previous example describes using the ARFCN, other values indicative of the carrier frequency may be used as well.

At 192C, the obtained information from the former cell may include for example user equipment context information, which can be used to configure, provision, and/or the like a cell/base station for the connection re-establishment with user equipment 114A. As noted, having this former cell information in the call re-establishment message 192A may enable the network to identify which layer (for example, carrier frequency) the indicated cell (which is indicated by the PCID) is located in and where the radio link failure occurred. With this former cell information, the network can fetch, from the former cell, information, such as the user equipment context.

After 192C, the process 100 may continue with for example additional operations including an RRC connection reestablishment message, an RRC connection reestablishment reject message, an RRC connection reestablishment complete message, and/or any other message or operation.

In some example embodiments, the system 100 may be implemented so that the network is coordinated in the sense that cells/base stations in the deployment have knowledge about neighboring cells/base station. This coordination may be established through a variety of ways including self optimizing network and/or self organizing network (SON) procedures. Moreover, these procedures may include mapping information including for example mapping between PCIDs and cell global identifiers (CGI). But in case of multilayer networks, the PCID might not be unique as noted but instead used by multiple cells. This lack of uniqueness will, under radio link failure-free operation, not cause any problems as the network can link PCID and carrier frequency information in the measurement report. However, when there is a radio link failure and an RRCConnection-ReestablishmentRequest sent message is sent, the network will not be able to uniquely identify the former cell based on the PCID contained in the RRCConnectionReestablishmentRequest sent at for example 192A unless message 192A is supplemented as disclosed herein with layer information.

Before providing additional examples, the following provides an example of a system framework in which some of the example embodiments described herein may be implemented.

Figure 2:
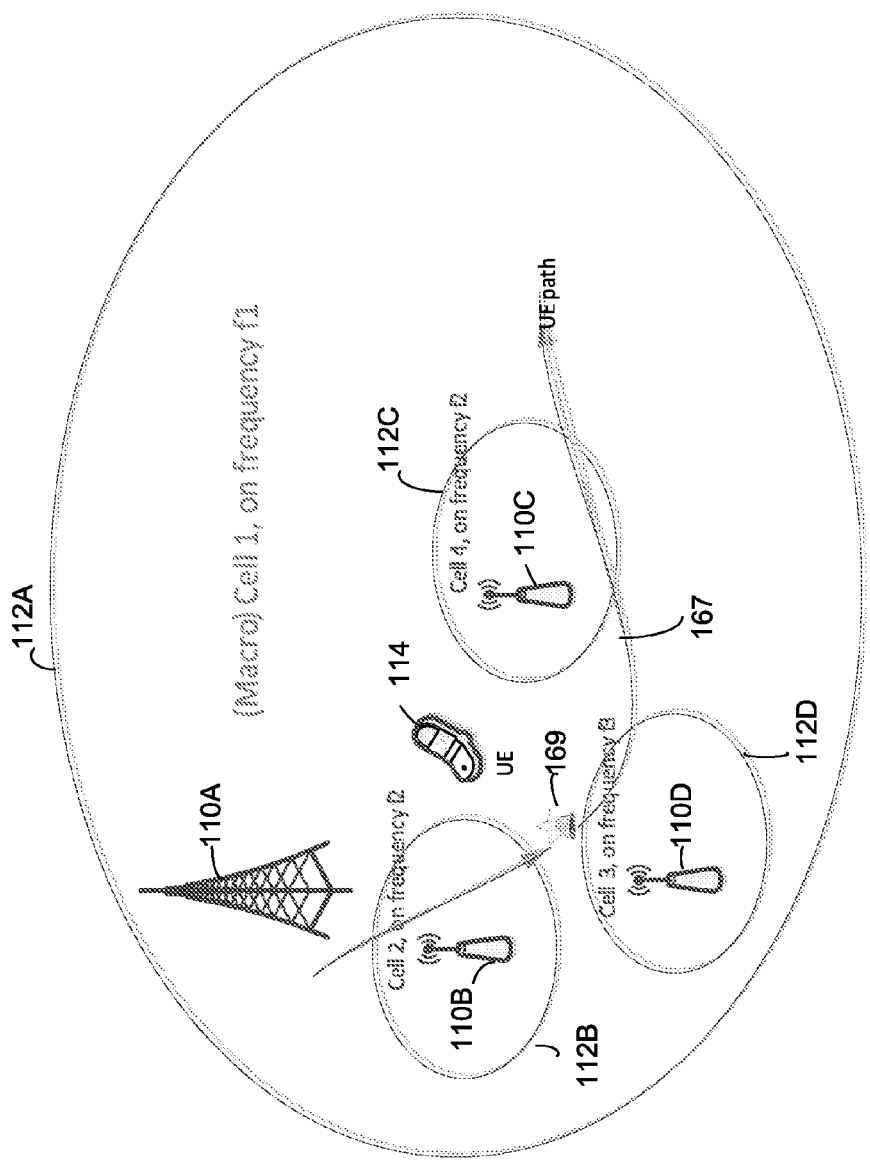
FIG. 2 depicts an example of a system configured to allow call re-establishment, in accordance with some exemplary embodiments.

FIG. 2 depicts a system 200, in accordance with some example embodiments. FIG. 2 depicts one or more wireless access points, such as base stations 110A-D, and a user equipment 114 traveling via path 167. FIG. 2 also depicts user equipment 114 leaving small cell 112B at a first carrier frequency f2, and approaching small cell 112D at frequency f3. In this example, small cell 112B represents a former cell, so when there is a radio link failure at 169 and a RRC connection re-establishment message is sent, the PCID may not be unique and additional layer information, such as the carrier frequency of former cell 112B/base station 110B may be used by the network including macro base station 110A and/or small cell 110D/base station 110D.

In the example of FIG. 2, wireless access point 110A may be configured as a base station, such as an eNB base station serving a macrocell 112A (also referred to as a cell and/or a coverage area). Wireless access points 110B-D may be configured to serve small cells 112B-D. For example, small cell 112B may be implemented as a picocell, a femtocell, and the like served by small cell base station 110B. Examples of small cell base stations include a picocell base station, a femtocell base station, a home base station, a WiFi access point, and a home E-UTRAN node B base station (HeNB) configured in accordance with standards, such as for example Third Generation Partnership Project (3GPP) Long Term Evolution (LTE). Although LTE is referred to herein, it is merely an example as other standards and technologies may be used as well. Moreover, small cell base stations may operate on a different carrier frequency than base station 110A serving the larger macrocell 112A, and, as such, when user equipment 114 is coupled to base station 110A serving macrocell 112A, user equipment 114 may need to search different frequencies (than the base station 110A) in order to find the small cell base stations 110B-C.

Moreover, base station 110A may, in some exemplary embodiments, be implemented as an evolved Node B (eNB) type base station, as noted above. When this is the case, base station 110A may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards).

FIG. 2 depicts the multi-layers represented by the different frequencies of the cells. For example, small cells 112A-D are on different carrier frequencies, each of which represents a so-called layer of the HetNet. In the example of FIG. 2, when the user equipment 114 encounters a radio link failure (RLF) as it departs cell 112B at 169, user equipment 114 may initiate a RRC connection re-establishment by sending a message, such as message 192A described above with respect to FIG. 1. This message may include the PCID of base station 110B/cell 112B and layer information, such as the carrier frequency, ARFCN, and/or other information related to the carrier frequency of the base station 110B/cell 112B. When the network identifies base station 110B/cell 112B based on the PCID and layer information, the network may obtain user equipment context information, which may be used to facilitate a handover to cell 112D/base station 110D and/or another cell, such as cell 112C/base station 11C. Although FIG. 2 depicts an example of a configuration for the base station 110A and small cell base stations 110B-D, base station 110A and small cell base stations 110B-D may be configured in other ways. For example, base station 110A and small cell base stations 110B-D may have wired and/or wireless backhaul links to other network nodes, such as a mobility management entity, other base stations, a radio network controller, a core network, a serving gateway, and the like.

In some exemplary embodiments, the system 200 may include wireless access links. The access links may include downlinks for transmitting to user equipment and an uplink for transmitting from user equipment to a base station. The downlink and uplink may each comprise a modulated radio frequency carrying information, such as user data, radio resource control (RRC) messages, location information, and the like.

In some exemplary embodiments, user equipment 114 may be implemented as a mobile device and/or a stationary device. The user equipment 114 are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some cases, user equipment may include a processor, a computer-readable storage medium (e.g., memory, storage, and the like), a radio access mechanism, and/or a user interface. User equipment 114 may, in some example embodiments, be configured to operate in a heterogeneous network (also referred to as a HetNet) including small cells, such as small cell 112B, and macrocells, such as cell 112A. In some example implementations configured as a heterogeneous network, user equipment 114 may access base station 110A, such as an evolved node B base station, serving macrocell 112A, and user equipment 114 may also access small cell base station 110B serving small cell 112B. In the example of the HetNet with macrocell and small cells are configured with different frequencies, the user equipment 114 connected to base station 110A serving the large macrocell 112A may perform inter-frequency measurements to find available offloading opportunities offered by the small cells, such as small cell 112B.

Although FIG. 2 depicts four wireless access points 110A-D, four cells, such as macrocell 112A and small cells 112B-D, and user equipment 114, the system 100 may include other quantities and types of wireless access points, cells, and user equipment as well.

Figure 3:
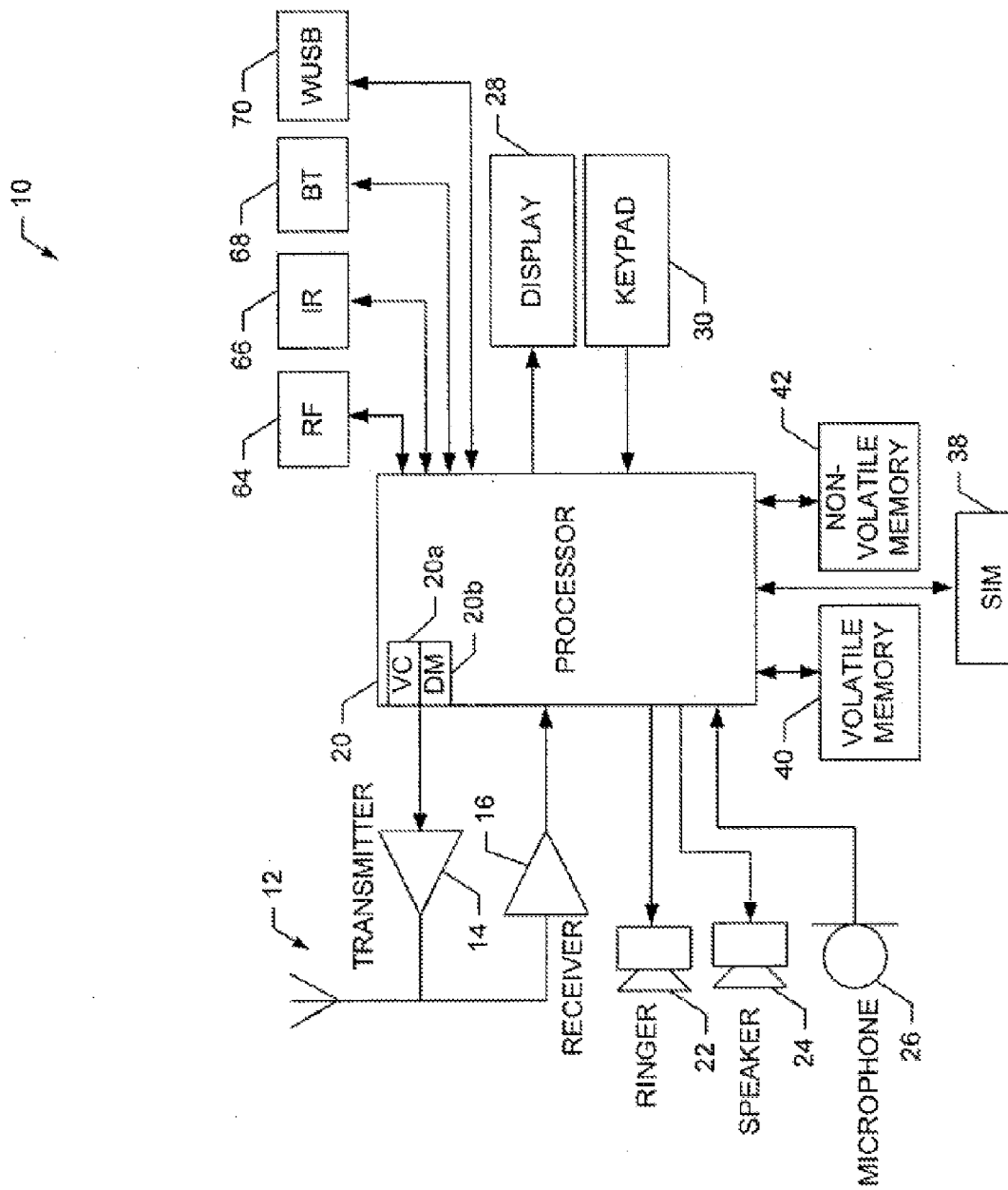
FIG. 3 depicts an example of a user equipment, in accordance with some exemplary embodiments.

FIG. 3 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment, such as for example, the functions disclosed at process 200 (for example, activate the cellular modem and/or the like). The memories may comprise an identifier, such as for example, an international mobile equipment identification (IMEI) code, capable of uniquely identifying apparatus 10. In the example embodiment, the processor 20 may be configured using computer code stored at memory 40 and/or 42 to enable generating messages, such as a call re-establishment information including layer information as disclosed herein.

Figure 4:
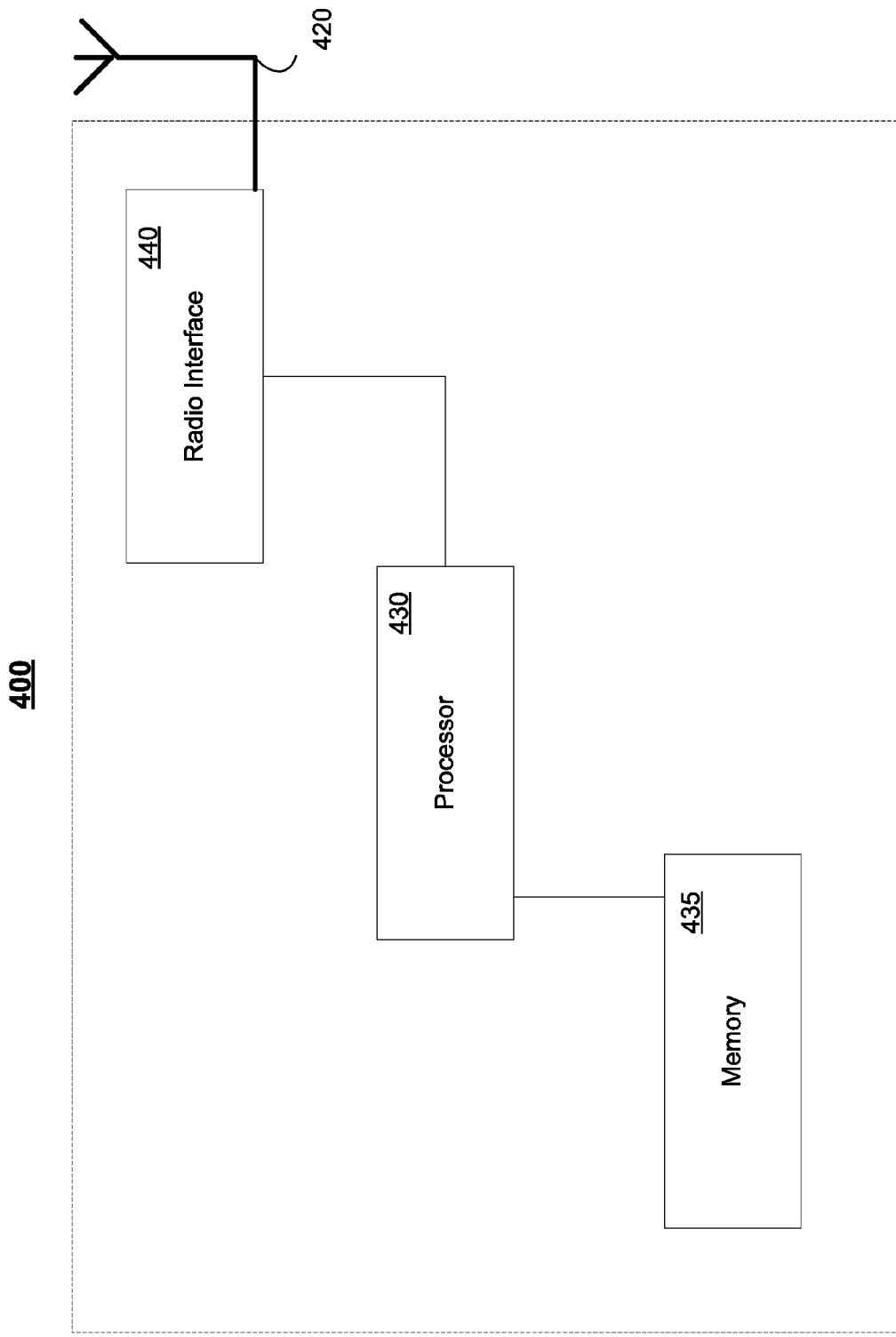
FIG. 4 depicts an example of a base station, in accordance with some exemplary embodiments.

FIG. 4 depicts an example implementation of a network node, such as base station 110. The base station may include one or more antennas 420 configured to transmit via a downlink and configured to receive uplinks via the antenna(s) 420. The base station may further include a plurality of radio interfaces 440 coupled to the antenna 420. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 440 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The base station may further include one or more processors, such as processor 430, for controlling the access point 400 and for accessing and executing program code stored in memory 435. In some example embodiments, memory 435 includes code, which when executed by at least one processor causes one or more of the operations described herein with respect to a base station. For example, the base station may obtain user equipment context information based on messages, such as a call re-establishment information including layer information provided by the user equipment and/or provide any other operations associated with the network or base station disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor, with examples depicted at FIGS. 3 and 4. A computer-readable medium may comprise a non-transitory computer-readable storage medium that may be any media that can contain or store the instructions for use by or in connection with an instruction execution system, apparatus, or device, such as for example, a computer. And, some of the embodiments disclosed herein include computer programs configured to cause methods as disclosed herein (see, for example, process 100 and/or the like).

Without in any way limiting the scope, interpretation, or application of the claims appearing below, a technical effect of one or more of the example embodiments disclosed herein is enabling a call re-establishment with context fetch in multilayer networks, such as HetNets and/or enabling the network to identify, after a RLF, a cell corresponding to a PCID reported in a connection re-establishment message.

If desired, the different functions discussed herein may be performed in a different order and/or concurrently with each other. Furthermore, if desired, one or more of the above-described functions may be optional or may be combined. Although various aspects of the some embodiments are set out in the independent claims, other aspects of the some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least."

What is claimed:
1. A method comprising:
   determining a radio link failure between a user equipment and a base station; and
   sending, by the user equipment after the determined radio link failure, a request to re-establish a connection, wherein the request includes carrier frequency information of the former base station serving the user equipment, the carrier frequency information comprising an indication of whether the carrier frequency of the former base station is the same as a carrier frequency of a current cell, the request comprises a radio resource connection re-establishment request message including a cell identity of the cell.
2. The method of claim 1, wherein the base station is associated with a network comprising a heterogeneous network.
3. An apparatus comprising:
   at least one processor; and
   at least one memory including computer program code, the at least one memory and the computer program code configured to, with the at least one processor, cause the apparatus to at least:

determine a radio link failure between the apparatus and a base station; and send, by the apparatus after the determined radio link failure, a request to re-establish a connection, wherein the request includes carrier frequency information of the former base station serving the apparatus, the carrier frequency information comprising an indication of whether the carrier frequency of the former base station is the same as a carrier frequency of a current cell, wherein the request comprises a radio resource connection re-establishment request message including a cell identity of the cell.

4. The apparatus of claim 3, wherein the base station is associated with a network comprising a heterogeneous network.

5. A non-transitory computer-readable storage medium including computer program code which when executed by at least one processor provides operations comprising:

determining a radio link failure between a user equipment and a base station; and sending, by the user equipment after the determined radio link failure, a request to re-establish a connection, wherein the request includes carrier frequency information of the former base station serving the user equipment, the carrier frequency information comprising an indication of whether the carrier frequency of the former base station is the same as a carrier frequency of a current cell, wherein the request comprises a radio resource connection re-establishment request message including a cell identity of the cell.

6. A method comprising:

receiving, at a base station, a request to re-establish a connection after a radio link failure at a user equipment, wherein the request includes carrier frequency information of the former base station serving the user equipment, wherein the request comprises a radio resource connection re-establishment request message including a cell identity of the cell; and re-establishing the connection to the base station based on at least the received information, the carrier frequency information comprising an indication of whether the carrier frequency of the former base station is the same as a carrier frequency of a current cell.

7. The method of claim 6, wherein the base station is associated with a network comprising a heterogeneous network.

8. An apparatus comprising:

at least one processor; and at least one memory including computer program code, the at least one memory and the computer program code configured to, with the at least one processor, cause the apparatus to at least:

receive a request to re-establish a connection after a radio link failure at a user equipment, wherein the request includes carrier frequency information of the former apparatus serving the user equipment, wherein the request comprises a radio resource connection re-establishment request message including a cell identity of the cell; and re-establish the connection to the apparatus based on at least the received information, the carrier frequency information comprising an indication of whether the carrier frequency of the former base station is the same as a carrier frequency of a current cell.

9. The apparatus of claim 8, and wherein the apparatus comprises a base station, and wherein the base station is associated with a network comprising a heterogeneous network.

10. A non-transitory computer-readable storage medium including computer program code which when executed by at least one processor provides operations comprising:

receiving, at a base station, a request to re-establish a connection after a radio link failure at a user equipment, wherein the request includes carrier frequency information of the former base station serving the user equipment, wherein the request comprises a radio resource connection re-establishment request message including a cell identity of the cell; and re-establishing the connection to the base station based on at least the received information, the carrier frequency information comprising an indication of whether the carrier frequency of the former base station is the same as a carrier frequency of a current cell.

* * * * *